United States Patent [19]
Moechnig et al.

[11] Patent Number: 5,935,626
[45] Date of Patent: Aug. 10, 1999

[54] WEATHER RESISTANT MINERAL FEEDS AND METHODS OF MAKING SAME

[75] Inventors: Bruce Willard Moechnig; Qingshan Gao, both of Quincy, Ill.

[73] Assignee: Moorman Manufacturing Company, Quincy, Ill.

[21] Appl. No.: 08/976,862

[22] Filed: Nov. 24, 1997

[51] Int. Cl.⁶ .............. A23K 1/175; A23K 1/00; A23B 4/03
[52] U.S. Cl. .............. 426/74; 426/89; 426/97; 426/443; 426/519; 426/635; 426/806; 426/807
[58] Field of Search ............... 426/74, 89, 97, 426/635, 443, 519, 806, 807

[56] References Cited

U.S. PATENT DOCUMENTS

| | | | |
|---|---|---|---|
| Re. 31,804 | 1/1985 | Skoch et al. | 426/658 |
| 2,152,438 | 3/1939 | McHan | 99/4 |
| 2,611,702 | 9/1952 | Potishman | 99/6 |
| 2,744,823 | 5/1956 | Diamond | 99/2 |
| 3,692,526 | 9/1972 | Rychman | 99/2 |
| 3,728,127 | 4/1973 | Palmer | 99/20 |
| 3,939,285 | 2/1976 | Yarrett et al. | 426/285 |
| 4,171,385 | 10/1979 | Skoch et al. | 426/658 |
| 4,252,831 | 2/1981 | Gleckler et al. | 426/74 |
| 4,265,916 | 5/1981 | Skoch et al. | 426/74 |
| 4,582,708 | 4/1986 | Tipton et al. | 426/807 |
| 4,832,967 | 5/1989 | Autant et al. | 426/96 |
| 5,068,114 | 11/1991 | Chanen et al. | 426/69 |
| 5,212,325 | 5/1993 | Lajoie | 554/156 |
| 5,380,890 | 1/1995 | Lajoie | 554/156 |
| 5,391,788 | 2/1995 | Dayton et al. | 554/156 |
| 5,397,787 | 3/1995 | Jones et al. | 554/156 |
| 5,425,963 | 6/1995 | Lajoie | 426/2 |
| 5,496,572 | 3/1996 | Rudden | 426/74 |
| 5,532,008 | 7/1996 | Sasaoka et al. | 426/73 |

*Primary Examiner*—Nina Bhat
*Attorney, Agent, or Firm*—Lockwood, Alex, Fitzgibbon & Cummings

[57] ABSTRACT

A weather resistant mineral feed in the form of free-flowing granules is produced in a series of steps comprising (1) mixing a liquid binder with a relatively coarse granular feed ingredient to form damp binder coated granules, (2) while damp, the binder-coated granules are mixed with a trace mineral base mix, (3) the granules with their outer layers of trace minerals are mixed with substances which impart water-resistant sheaths thereto, and (4) dusting powder is applied to complete the formation of the trace mineral premix granules. The premix granules are mixed with coarse granular macromineral feed ingredients, iron oxide and a water-resistant coating solution to form weather-resistant mineral feed granules. The water-resistant sheathes are formed by mixing the product of step (2) with a fatty acid and depositing thereon a metal oxide with which it reacts.

9 Claims, 2 Drawing Sheets

THE DUSTING LAYER

THE PROTECTIVE LAYER

THE LAYER CONTAINING TRACE MINERALS

THE CORE

WEATHER RESISTANT MINERAL FEEDS AND METHODS OF MAKING SAME

BACKGROUND OF THE INVENTION

This invention relates to innovations and improvements in water-resistant or weatherized mineral feeds for animals. Such feeds are consumed by animals in pastures, on the range or in feedlots where they are to at least some extent, if not entirely, exposed to the weather.

DISCUSSION OF THE PRIOR ART

Weather-resistant mineral feeds for animals, often referred to as "weatherized minerals" have been available for a number of years. For many years, mineral feed products have been weatherized to reduce losses from wind and rain by application of petrolatum to the minerals and the inclusion of molasses to increase palatability. Ingredients in a typical mineral feed can be categorized in three groups: macrominerals, trace minerals (microminerals), and other functional materials. Macrominerals range in size from fine to coarse granules while trace minerals are usually fine granules or powders. Due to their small size, the major losses from rain leaching or wind erosion occur in the trace minerals.

In the prior procedures for producing weatherized mineral feeds, the first step in the process has been to mix the macro ingredients, micro ingredients, salt, and functional materials. Thereafter, petrolatum and molasses are added to the mixture followed by a period of mixing so as to uniformly distribute the molasses and petrolatum throughout the mix. Heretofore, iron oxide has been included in the formula in order to impart a red color to the final product.

While weatherized or water-resistant mineral feeds formulated and produced in accordance with the prior art have been consumed in large quantities over the years, the finer fraction of such feeds which includes primarily the trace minerals and water soluble components has been susceptible to appreciable rain leaching and wind erosion.

SUMMARY OF THE INVENTION

The objects of the invention are to provide the following improvements in weather-resistant or weatherized mineral feeds for animals and methods of producing the same:

1. An improved process that reduces the loss of water soluble components of an animal mineral feed mixture when exposed to rain/snow/sleet. This improvement is achieved through the agglomeration of the water soluble components onto a coarse particle which is then coated to form a water-resistant layer.

2. An improved process that reduces the loss of mineral components of an animal mineral feed mixture by preventing the mineral components from being readily airborne when exposed to wind. This improvement is due to the enlarged particle size resulting from the agglomeration of the fine components to the solid particle base.

3. An improved animal mineral feed product with reduced dustiness.

4. An improved animal mineral feed product that is less susceptible to chemical reaction with other feed ingredients due to the weather-resistant coating.

5. A readily-consumed animal feed consisting of agglomerated, coated particles mixed with coarse water insoluble macro mineral sources in granular form (e.g. limestone, dicalcium phosphate, bone meal, etc.)

6. An improved animal mineral feed product that is less corrosive to feeders due to coating of water soluble components with hydrophobic coating.

7. An improved animal mineral feed product with reduced tendency for segregation of mineral components.

8. An improved animal mineral feed product with reduced electrostatic tendency to minimize accumulations of fine materials on metal surfaces where they may build up and corrode feeders.

9. Improved animal mineral feed products that may be produced and fed in free-flowing form and also in other forms including tubs, blocks, pellets and cubes.

In accordance with the present invention, a premix is first formed which serves as a water and weather-resistant carrier for trace minerals and other ingredients which are highly susceptible to loss due to rain and wind. After the free-flowing premix has been formed, it is mixed with relatively coarse macrominerals and iron oxide in the presence of a water-resistant coating solution.

The core or center base for the premix in the present invention is a coarse, dry, granular product having a particle size range of 7–30 mesh with 10–20 mesh preferred. Typical core materials may include salt, dicalcium phosphate, granular limestone and magnesium oxide. Since salt is a common ingredient of mineral feeds for animals, coarse salt such as food grade pretzel salt with a particle size range of 12–20 mesh will serve as a solid base core on which the trace minerals and other water susceptible ingredients may be agglomerated. In the agglomeration process, coarse salt and/or other coarse core material such as dicalcium phosphate are first mixed with a liquid binder such as a condensed byproduct from the grain, food or feed processing industries including, for example, Brewex (a condensed molasses-like by-product of the brewing industry), corn steep liquor, condensed porcine solubles, molasses, or condensed distillers solubles. The liquid binder will leave the core particles in a damp condition suitable for mixing with a trace mineral and dry binder base mix. Trace minerals may include materials such as: cobalt carbonate, copper sulfate, potassium iodide, iron sulfate, manganous oxide and zinc oxide. In addition, as part of the trace mineral base mix, nutrients and/or known feed additives may be included. Dry binder may be used in the base mix to provide more adhesive force to help agglomeration of the trace mineral particles onto the core particles. The dry binder may be hygroscopic fine powders such as whey permeate, dry calcium lignin sulfonate, corn syrup solids or whole whey.

After forming the coarse granules with their deposits of trace minerals, a protective layer is applied to the granules. The formation of this protective layer may be achieved through any of several methods. In one embodiment, the layer is formed by adding a metal oxide powder to the granules, followed by adding a fatty acid. The chemical reaction between the metal oxide and the fatty acids forms a coating in the form of a water-resistant soap. Alternatively, saturated hydrocarbons such as petrolatum or paraffin wax may be mixed with the granules to form a water-resistant coating. In order to produce the premix in a dry, free-flowing form, the resulting protected granules are blended with a dusting powder. The dusting powder may be any of several fine organic, or inorganic materials such as starches, clays, talc or diatomaceous earth. The resulting premix will be in the form of coarse dry particles or granules having solid core centers.

As stated above, a key problem connected with weatherized mineral feeds that have previously been available has been their susceptibility to loss of their content of trace minerals due to rain and wind. This problem has been overcome in accordance with the present invention by the preparation of a premix in the form of granules or particles formed of relatively coarse centers or cores on which the trace minerals and related ingredients are deposited with the particles having a weather-resistant exterior sheath or protective coating. Once a premix composed of such particles or granules has been formed, it may be readily mixed with the remaining components of the weatherized mineral feed, namely, macrominerals and iron oxide and a suitable water-resistant coating composition.

Figure 3:
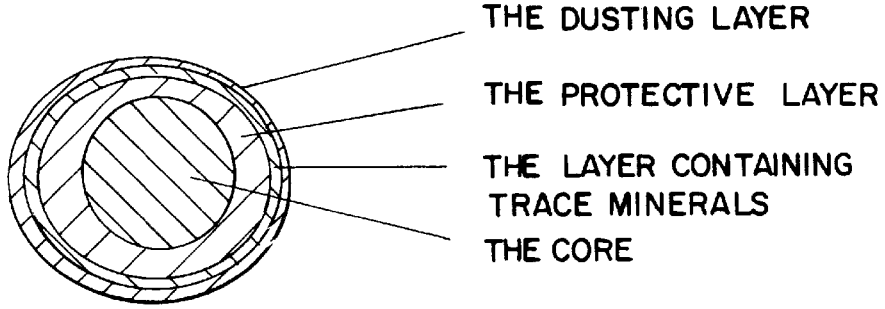
FIG. 3 is a diagrammatic representation of the structure of the granules or particles of premix formed in accordance with the invention.

The structure of a premix particle or granule formed in accordance with the invention is illustrated in FIG. 3. As stated above, the core or center of the premix granule or particle is formed of a suitable coarse feed ingredient such as salt, dicalcium phosphate, granular limestone or magnesium oxide, or mixtures thereof. As indicated, the core has a layer containing trace minerals on it, which in turn is encased in a water-resistant sheath. The water-resistant sheath may consist of a soap formed by the reaction of metal oxide with fatty acids or a saturated hydrocarbon such as petrolatum or paraffin wax. In order to render the granules or particles free-flowing for easy mixing with other ingredients, the protective layer is covered with a dusting layer provided by one or more of the above-mentioned dusting powders, starch being a preferred material.

Figure 1:
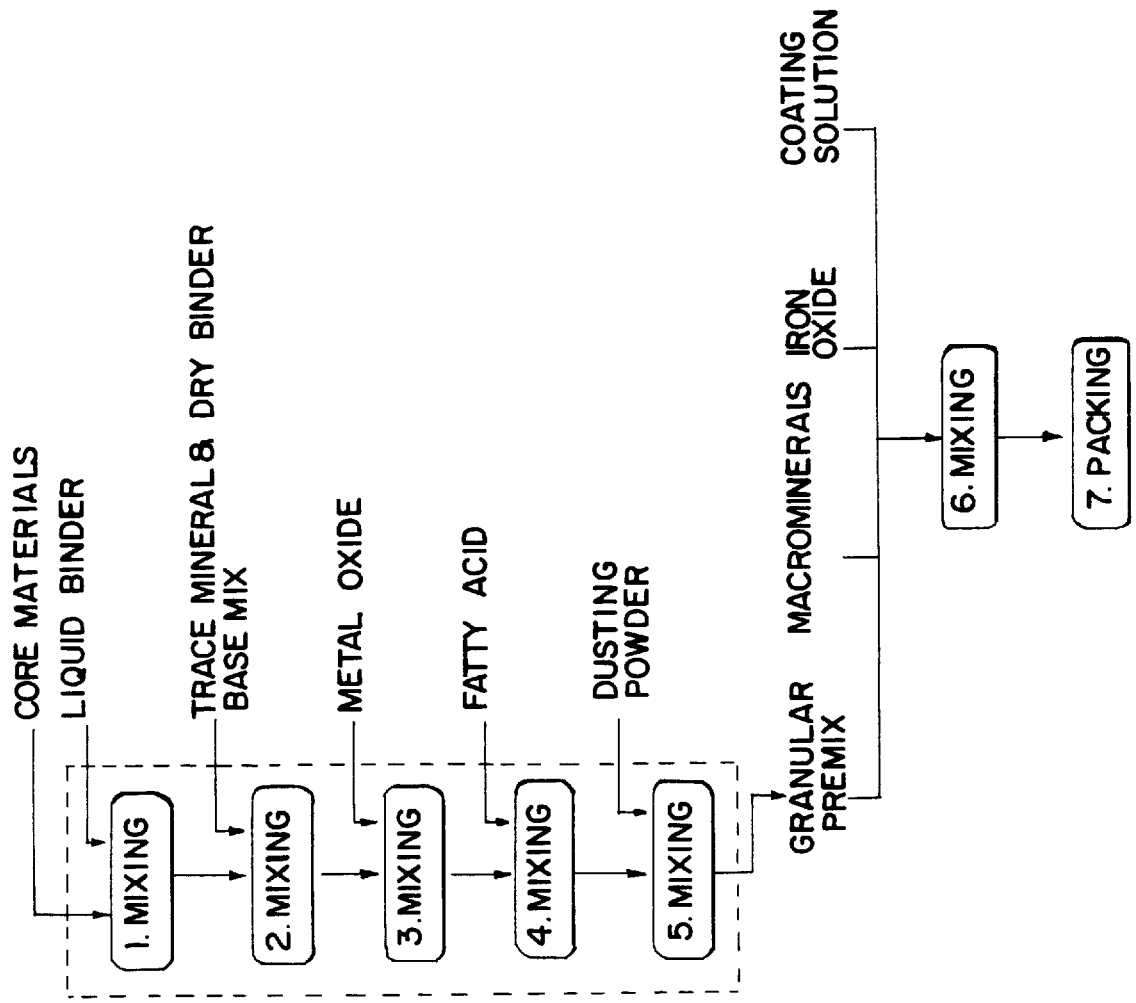
FIG. 1 is a flow diagram of a presently preferred process according to the invention.

A suitable premix of the invention is formed in five distinct steps as shown in FIG. 1. If desired, all of these steps can be carried out in the same mixer which can be one of several known type mixers which are commercially available.

Step 1. To a predetermined quantity of core material (10–20 mesh) liquid binder is added with mixing for approximately 1–2 minutes.

Step 2. In this step, a trace mineral base mix and dry binder are mixed with the product of Step 1 for approximately 1 to 2 minutes. Trace minerals may include one or more of those mentioned above. In addition, as part of the trace mineral base mix, nutrients and/or feed additives may be included. The nutrients added may include such components as macro minerals that are water soluble, vitamins, microbials and amino acids. Feed additives may include such components as ionophores, antibiotics or feedthrough anthelmentics.

It has been found that when a dry binder is used in the process it not only absorbs moisture from the liquid binder and holds the moisture, preventing (or retarding) the moisture from acting on the core material, but it also assists in adhering the trace minerals particles to the core. With or without a dry binder, moist agglomerated particles are produced at the end of Step 2.

Step 3. In this step, a soap forming metal oxide such as calcium oxide or magnesium oxide is mixed with the product of Step 2 for approximately 1 minute.

Step 4. In this step, a fatty acid is added to the mixture from Step 3 with mixing for 1–2 minutes. Unsaturated fatty acids that readily react with the metal oxide to form water insoluble soaps are desired. Specifically, purified free fatty acids and acidulated soapstocks have been found to be desirable. The reaction between the metal oxide and the fatty acid may be hastened by the addition of heat to the mixture.

Step 5. In order to form or convert the product of Step 4 into free-flowing premix granules or particles suitable for mixing with other components, the product of Step 4 is mixed with a suitable dusting powder such as starch, clays, talc, or diatomaceous earth.

The premix granules from Steps 1–5 are mixed for approximately 3–5 minutes with macrominerals, iron oxide and a water-resistant coating solution. The macrominerals will usually be one or more of the following: limestone, magnesium oxide, dicalcium phosphate, bone meal, potassium chloride, monoamonium phosphate, salt, ammonium chloride, magnesium sulfate or defluorinated phosphate. The iron oxide is included primarily in order to impart a desirable red color to the finished product. As suitable coating solutions for step 6, petrolatum and various lipid solutions can be used such as a fat-lecithin solution or a fat-lecithin molasses solution.

Following completion of step 6, the product is in condition for packing and shipment.

As a modification of the process of FIG. 1, the dry binder may be separately admixed with the coarse core or center material prior to addition and mixing with the liquid binder.

Figure 2:
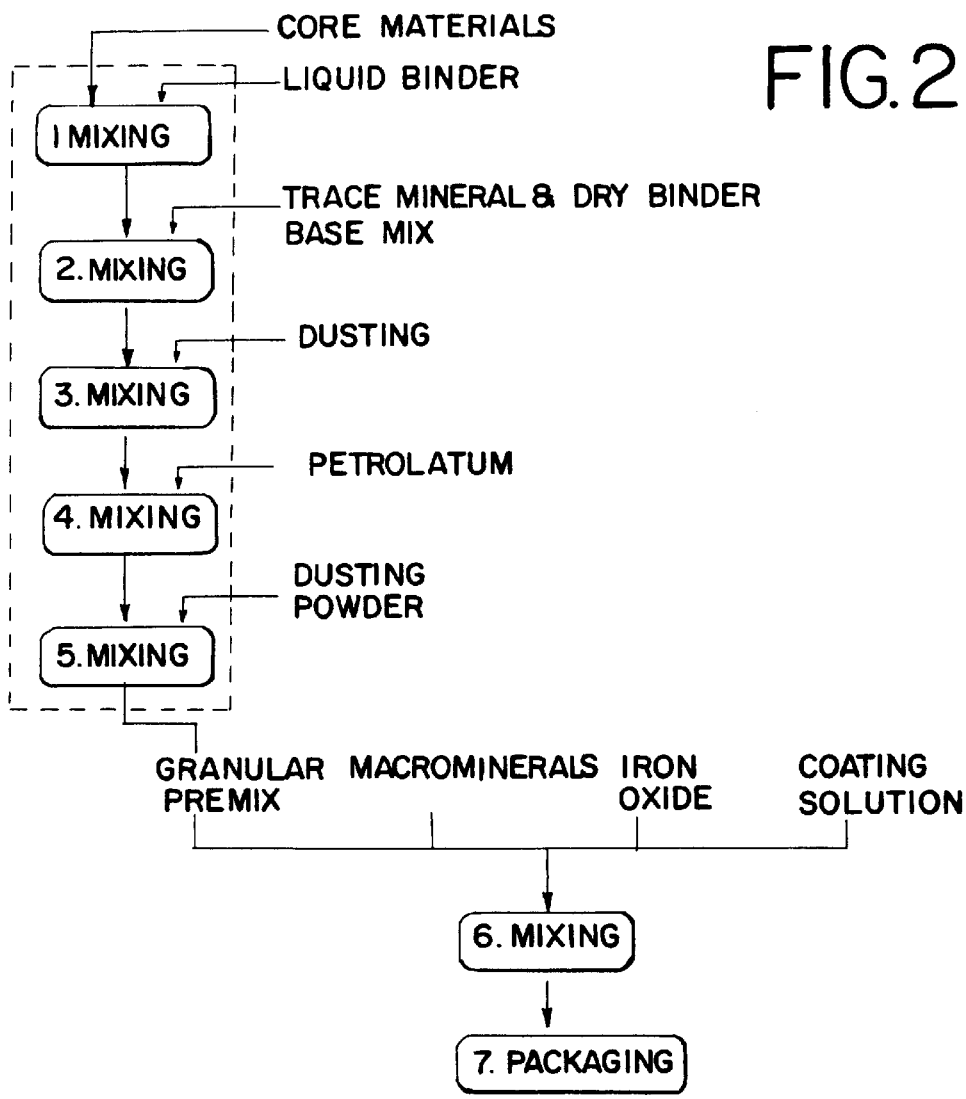
FIG. 2 is a flow diagram of a process forming another embodiment of the invention.

In the flow diagram of FIG. 2, in Step 3 a dusting powder which may be magnesium oxide is mixed with the granules from Step 2. In Step 4 a saturated hydrocarbon such as petrolatum or paraffin is mixed with the granules from Step 3.

The following general and specific examples will illustrate and disclose the invention having reference to FIGS. 1 and 2.

EXAMPLE 1

Making of the Granular Premix

| Ingredient | % by weight |
|---|---|
| Salt (10–20 mesh) | 50–75 |
| Brewex | 4–7 |
| Trace Mineral Base Mix | 5–30 |
| Magnesium Oxide | 3–10 |
| Soapstock | 3–10 |
| Starch | 1–5 |

1). Add salt into a mixer
2). Add brewex into mixer, mix 1–2 min.
3). Add trace mineral base mix into the mixer, mix 1–2 min.
4). Add magnesium oxide into the mixer, mix 1 min.
5). Add soapstock into the mixer, mix 1–2 min.
6). Add starch into the mixer, mix 1 min.

Making of the Final Mineral Mix

| Ingredient | % by weight |
|---|---|
| Granular Premix | 15–35 |
| Dicalcium Phosphate | 10–50 |
| Limestone | 10–50 |
| Defluorinated Phosphate | .5–5 |
| Iron Oxide | .5–1.5 |
| Petrolatum | 1.5–3 |

1). Add all of the ingredients except petrolatum into a mixer, mix 1 min.

2). Add petrolatum into the mixer, mix 3 min.

EXAMPLE 2

Making of the Granular Premix

| Ingredient | % by weight |
|---|---|
| Salt (10–20 mesh) | 55.5 |
| Brewex | 5.5 |
| Trace Mineral Base Mix | 25.0 |
| Magnesium Oxide | 6.0 |
| Soapstock | 4.0 |
| Starch | 4.0 |

1). Add salt into a mixer
2). Add brewex into mixer, mix 1–2 min.
3). Add trace mineral base mix into the mixer, mix 1–2 min.
4). Add magnesium oxide into the mixer, mix 1 min.
5). Add soapstock into the mixer, mix 1–2 min.
6). Add starch into the mixer, mix 1 min.

Making of the Final Mineral Mix

| Ingredient | % by weight |
|---|---|
| Granular Premix | 26.2 |
| Dicalcium Phosphate | 38.3 |
| Limestone | 31.0 |
| Defluorinated Phosphate | 1.0 |
| Iron Oxide | 1.0 |
| Petrolatum | 2.5 |

1). Add all of the ingredients except petrolatum into a mixer, mix 1 min.
2). Add petrolatum into the mixer, mix 3 min.

EXAMPLE 3

Making of the Granular Premix

| Ingredient | % by weight |
|---|---|
| Coarse Dicalcium Phosphate | 50–75 |
| Brewex | 4–10 |
| Trace Mineral Base Mix | 5–30 |
| Magnesium Oxide | 3–10 |
| Petrolatum | 1–3 |

1). Add coarse dicalcium phosphate into a mixer.
2). Add brewex into mixer mix 1–2 min.
3). Add trace mineral base mix into the mixer, mix 1–2 min.
4). Add magnesium oxide into the mixer, mix 1 min.
5). Add petrolatum into the mixer, mix 1–2 min.

Making of the Final Mineral Mix

| Ingredient | % by weight |
|---|---|
| Granular Premix | 15–35 |
| Dicalcium Phosphate | 10–50 |
| Limestone | 10–50 |
| Salt | 1–20 |
| Defluorinated Phosphate | .5–5 |
| Iron Oxide | .5–1.5 |
| Petrolatum | 1.5–3 |

1). Add all of the ingredients except petrolatum into a mixer, mix 1 min.
2). Add petrolatum into the mixer, mix 3 min.

EXAMPLE 4

Making of the Granular Premix

| Ingredient | % by weight |
|---|---|
| Coarse Dicalcium Phosphate | 60.8 |
| Brewex | 6.7 |
| Trace Mineral Base Mix | 25.0 |
| Magnesium Oxide | 5.0 |
| Petrolatum | 2.5 |

1). Add coarse dicalcium phosphate into a mixer.
2). Add brewex into mixer, mix 1–2 min.
3). Add trace mineral base mix into the mixer, mix 1–2 min.
4). Add magnesium oxide into the mixer, mix 1 min.
5). Add petrolatum into the mixer, mix 1–2 min.

Making of the Final Mineral Mix

| Ingredient | % by weight |
|---|---|
| Granular Premix | 26.2 |
| Dicalcium Phosphate | 23.3 |
| Limestone | 31.0 |
| Salt | 15.0 |
| Defluorinated Phosphate | 1.0 |
| Iron Oxide | 1.0 |
| Petrolatum | 2.5 |

1). Add all of the ingredients except petrolatum into a mixer, mix 1 min.
2). Add petrolatum into the mixer, mix 3 min.

In view of the foregoing description taken with the examples and accompanying drawing, those skilled in the art will be able to practice the invention in various embodiments without departing from the spirit and scope of the invention as defined in the appended claims.

What is claimed is:

1. The method of making a trace mineral premix in the form of free-flowing granules for incorporation in a weather-resistant mineral feed for animals comprising the following series of steps:

(1) mixing a liquid binder with a relatively coarse granular feed ingredient to provide damp binder coated cores;

(2) mixing the damp binder-coated cores of step 1 with a trace mineral base mix to provide said cores with a layer of trace minerals;

(3) mixing the product of step 2 with substances which form a water-resistant sheath over said layer of trace minerals; and (4) mixing the product of step 3 with a dusting powder to form a dust layer over said water-resistant sheaths and complete the formation of said free-flowing premix granules.

2. The method of making a weather-resistant mineral feed for animals which comprises mixing said premix granules made in accordance with claim 1 with coarse granular macromineral feed ingredients, iron oxide and a water-resistant coating solution.

3. Weather-resistant mineral animal feed made in accordance with the method of claim 2.

4. The method of making a trace mineral premix in the form of free-flowing granules for incorporation in a weather-resistant mineral feed for animals comprising the following series of steps:
   (1) mixing a liquid binder with a relatively coarse granular feed ingredient to provide damp binder coated cores;
   (2) mixing the damp binder-coated cores of step 1 with a trace mineral base mix to provide said cores with a layer of trace minerals;
   (3) mixing the product of step 2 with a metal oxide;
   (4) mixing the product of step 3 with a fatty acid and allowing said metal oxide and fatty acid to react and form a water-insoluble coating on the product of step 2; and
   (5) mixing the product of step 4 with a dusting powder to complete the formation of said free-flowing premix granules.

5. The method of making a weather-resistant mineral feed for animals comprising mixing said premix granules made in accordance with claim 4 with coarse granular macromineral feed ingredients, iron oxide and a water-resistant coating solution.

6. Weather-resistant mineral animal feed made in accordance with the method of claim 5.

7. The method of making a trace mineral premix in the form of free-flowing granules for incorporation in a weather-resistant mineral feed for animals comprising the following series of steps;
   (1) mixing a liquid binder with a relatively coarse granular feed ingredient to provide damp binder coated cores;
   (2) mixing the damp binder-coated cores of step 1 with a trace mineral base mix to provide said cores with a layer of trace minerals;
   (3) mixing the product of step 2 with a dusting material;
   (4) mixing the product of step 3 with a hydrocarbon of the group comprising petrolatum and paraffin to form a water-resistant sheath over said dusted layer of trace minerals; and
   (5) mixing the product of step 4 with a dusting powder to complete the formation of said free-flowing premix granules.

8. The method of making a weather-resistant mineral feed for animals comprising mixing said premix granules made in accordance with claim 7 with coarse granular macromineral feed ingredients, iron oxide and a water-resistant coating solution.

9. Weather-resistant animal feed made in accordance with the method of claim 8.

* * * * *